W. F. DOWNEY.
TRAPS FOR PREVENTING THE INFLOW OF BACK-WATER.
No. 187,364. Patented Feb. 13, 1877.
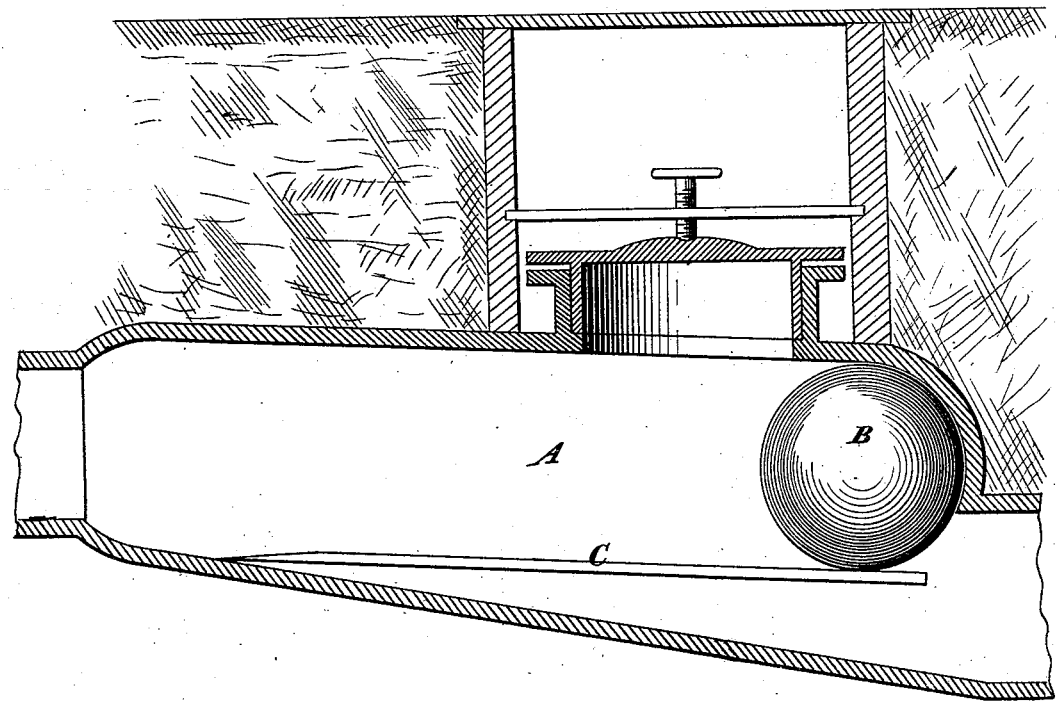
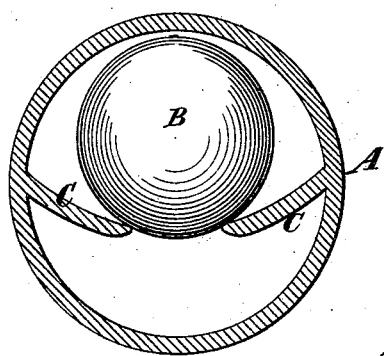

UNITED STATES PATENT OFFICE.

WILLIAM F. DOWNEY, OF WASHINGTON, DISTRICT OF COLUMBIA.

IMPROVEMENT IN TRAPS FOR PREVENTING THE INFLOW OF BACKWATER.

Specification forming part of Letters Patent No. 187,364, dated February 13, 1877; application filed December 16, 1876.

*To all whom it may concern:*

Be it known that I, WILLIAM F. DOWNEY, of Washington, in the District of Columbia, have invented a new and useful Improvement in Traps for Preventing the Inflow of Backwater, of which the following is a specification:

This invention has for its object a trap for preventing a back flow of water, while not interfering with its free outflow under normal conditions. It is capable of application to a variety of uses. I have illustrated its application to a sewer-trap, where it is employed to prevent the flow of water from the sewer back through the laterals into the cellars and basement of buildings. It consists of a section containing a valve, so placed that it will not interfere with the free outward flow ordinarily, but which will rise against a seat, and so prevent an inflow in time of high tides or floods.

In the annexed drawing, making part of this specification, Figure 1 is a vertical longitudinal section, and Fig. 2 is a vertical transverse section.

The same letters are employed in both figures in the designation of identical parts.

A is a section of the lateral, preferably to be placed outside the house. Below this section I would place the ordinary bent stench-trap. In the section A I place a ball-valve, B, which lies upon the edges of horizontal or vertical ways C. These ways should be inclined, so as to keep the ball normally at the lower and wider end of the section. They should be sufficiently elevated to permit the ordinary downward flow through the lateral without disturbance from the ways or ball, and when the device is used as a sewer the ways should have a downward inclination, and stop short of the upper end of the section, so as not to catch solid substances carried down with the water, which will float with the current down the steeply-inclined side of the section, passing under the ways and under the ball.

The ball should be made of some substance which will float, or made hollow, so as to bring the specific gravity of its mass below that of water. When the flood flows back and fills the chamber the ball-valve will be floated to the upper end of the section, where there is an annular valve-seat, into which it fits with a water-tight joint, closing the pipe and preventing the further back flow.

I prefer to make the surface of the valve or the valve-seat of some elastic substance, as affording the cheapest mode of making a water-tight joint.

In adapting my invention to use as a sewer-trap, I will build a man-hole in the brick-work, and adapt a plate so that it may be readily removed to give access to the interior of the valve-chamber. This will enable the valve to be adjusted in case of necessity, and the interior of the trap kept in good order.

The same form of trap may be adapted to many other uses—as, for instance, to the scuppers and ports of ships, to the exclusion of tides, waves, or floods in other relations.

What I claim as my invention, and desire to secure by Letters Patent, is—

1. A water-trap combining in its construction the shell A and valve-seat, ball-valve B, and way C, arranged to operate substantially as set forth.

2. The shell A, constructed with a man-hole, in combination with the ball-valve and ways, substantially as set forth, for giving access to the valve and seat.

In testimony whereof I have signed my name to this specification in the presence of two subscribing witnesses.

WM. F. DOWNEY.

Witnesses:
D. P. HOLLOWAY,
A. RUPPERT.